(12) United States Patent
Barinov et al.

(10) Patent No.: US 8,961,738 B2
(45) Date of Patent: Feb. 24, 2015

(54) METHODS AND APPARATUS FOR ELECTRICALLY MODIFYING GEL ADHESION

(75) Inventors: Victor Barinov, Brooklyn, NY (US); Kalle Levon, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 243 days.

(21) Appl. No.: 13/570,299

(22) Filed: Aug. 9, 2012

(65) Prior Publication Data

US 2012/0325410 A1 Dec. 27, 2012

Related U.S. Application Data

(63) Continuation of application No. 11/666,567, filed as application No. PCT/US2005/039423 on Nov. 1, 2005, now Pat. No. 8,241,458.

(60) Provisional application No. 60/623,886, filed on Nov. 1, 2004.

(51) Int. Cl.
*B32B 38/10* (2006.01)
*C09J 5/00* (2006.01)

(52) U.S. Cl.
CPC .............. *C09J 5/00* (2013.01); *C09J 2205/302* (2013.01)
USPC .......... 156/712; 205/702; 29/403.3; 29/426.4

(58) Field of Classification Search
USPC ........ 156/712, 759; 205/702; 29/403.3, 426.4
See application file for complete search history.

(56) References Cited

U.S. PATENT DOCUMENTS

| 4,635,416 A | 1/1987 | Ayala |
| 5,250,131 A | 10/1993 | Gitelman |
| 5,290,380 A | 3/1994 | Gitelman et al. |
| 6,030,519 A | 2/2000 | Keller et al. |
| 6,700,104 B2 | 3/2004 | Bass |
| 7,431,819 B2 | 10/2008 | Nanno et al. |
| 2001/0031367 A1 | 10/2001 | Gilbert |
| 2002/0061968 A1 | 5/2002 | Yoshihara et al. |
| 2004/0249037 A1 | 12/2004 | Kolbe et al. |

FOREIGN PATENT DOCUMENTS

| WO | WO 03042315 A1 | 5/2003 |
| WO | WO 03097317 A1 | 11/2003 |

*Primary Examiner* — Mark A Osele
(74) *Attorney, Agent, or Firm* — Frommer Lawrence & Haug LLP; William S. Frommer

(57) ABSTRACT

The invention concerns a method for controlling the adhesive bond between an electric-field responsive material and a substrate, which method comprises using an electric field to control the strength and integrity of the adhesive bond. The method may be used, for example, for removing or delaminating a material, which material is responsive to an electric field, from a substrate. The invention further comprises elimination of the application of the electric field and application of the previously removed electric-field-responsive material to the substrate, thereby resuming the strength and integrity of the adhesive bond. The invention includes apparatus for use in the bond controlling process.

37 Claims, 4 Drawing Sheets

A TECHNIQUE FOR ELECTRICAL DISBONDING OF GEL-ALUMINUM BOND.

PULL-OFF ADHESION TEST UNDER THE EFFECT
OF ELECTRIC FIELD.

A TECHNIQUE FOR ELECTRICAL DISBONDING
OF GEL-ALUMINUM BOND.

ELECTRIC FIELD EFFECT ON THE ADHESION STRENGTH OF POLY (N-isopropylacrylamide) HYDROGEL.

ELECTRIC FIELD EFFECT ON THE ADHESION
STRENGTH OF POLY (ethylene oxide) HYDROGEL.

METHODS AND APPARATUS FOR ELECTRICALLY MODIFYING GEL ADHESION

This application is a continuation of U.S. patent application Ser. No. 11/666,567, now U.S. Pat. No. 8,241,458, which claims priority from PCT Patent Application No. PCT/US2005/039423 filed Nov. 1, 2005, which claims priority from U.S. Provisional Patent Application 60/623,886 filed Nov. 1, 2004, the disclosures of which are incorporated herein by reference in their entirety.

FIELD OF THE INVENTION

The invention relates to the modification of the adhesive properties of gels. More specifically, the present invention concerns methods and apparatus for modifying the adhesion of an electro-responsive composition of matter, herein referred to as a "sample", to a substrate.

BACKGROUND

Gels are macromolecules cross-linked by chemical or physical fastenings forming a polymer network that is highly swollen by a solvent. Normally the mass of the absorbed solvent heavily exceeds the mass of the polymer network. When gels are applied to surfaces, adhesive bonds form due to the intermolecular attraction between unlike molecules, such as those in a gel and in a surface. Each bond may be characterized by adhesion strength which is equal to the disbonding force divided by the bond area.

The adhesion strength of such a bond may vary from high to very low depending on the level of gel-surface interaction. If adhesion-control tools are available, i.e., modalities capable of increasing the adhesion of gels naturally having a low adhesion strength and capable of decreasing the adhesion of gels naturally having a high adhesion strength, the range of applications of the given system is much broader and much more desirable.

Another desirable feature of adhesion control is reversible and repeatable adhesion, e.g. adhesion of the given gel-surface interface can be increased or decreased within a range of naturally possible adhesion strengths. Reversible and repeatable adhesion provides a solution for the long-standing problem of achieving the correct balance between a tight seal and an easy peel of gel-forming polymeric materials.

The adhesion strength of a material can be controlled using several methods. For example, certain control methods are described in U.S. Pat. No. 4,985,274 and U.S. Pat. No. 6,546,624.

U.S. Pat. No. 4,985,274 relates to a method for preparing pressure sensitive adhesives in which the release force of the adhesive can be controlled by controlling the amount of oxygen introduced that is reactive with the release coating.

U.S. Pat. No. 6,546,624 relates to a process including a removable film having removability wherein said removability enables the film to be removed from a substrate after the film is drilled by laser light along with the substrate.

However, an effective tool for adhesion control is an electric field; an electric field may be used for incorporating or contacting materials.

For example, U.S. Pat. No. 5,552,012 concerns a manner for incorporating a material responsive to an electric field into an absorbent structure, wherein the material responsive to an electric field remains substantially neutrally charged during the process. The absorbent structure is prepared by a known process comprising using an electric field to contact a material responsive to an electric field, selected from the group consisting of a hydrogel-forming polymeric material and an adhesive material, with a substrate, wherein the material responsive to an electric field remains substantially neutrally charged during the process.

In U.S. Pat. No. 4,900,387, the electroreological material increases and maintains the viscosity of the adhesive in a nonflowable, gel-state when an electric field is applied, and keeps it from running.

An electric field may also be used for paint removal from a substrate. U.S. Pat. No. 5,507,926 is directed to a method of electrolytically separating a paint coating from a metal surface comprising the steps of providing a metal member having a surface having a paint coating thereon and contacting the member with an essentially neutral electrolytic solution. The metal member is made cathodic in an electrolytic cell and current is passed from an anode through the electrolytic solution to the metal member for a time sufficient to cause the paint coating to separate from the metal member.

U.S. Pat. No. 6,030,519 also relates to paint removal from metal members such as metal parts, objects and structures and more particularly. It relates to an anode electrode pad for electrolytically assisted removal of paint from large structures such as bridge structures, tanks, ships, airplanes, automobiles and the like. This method of electrolytically separating a paint coating from a metal surface comprising the steps of providing a metal member having a surface having a paint coating thereon and contacting the member with an essentially neutral electrolytic solution. The metal member is made cathodic in an electrolytic cell and current is passed from an anode electrode pad through the electrolytic solution to the metal member for a time sufficient to cause the paint coating to separate from the metal member.

U.S. Patent Application Publication No. 20010031367 discusses an electrochemically disbondable composition having a matrix functionality and an electrolyte functionality, wherein the electrolyte functionality may be provided by a block copolymer or a graft copolymer. The matrix functionality provides an adhesive bond to a substrate, and the electrolyte functionality provides sufficient ionic conductivity to the composition to support a faradic reaction at an interface with an electrically conductive surface in contact with the composition, whereby the adhesive bond is weakened at the interface. The composition may be a phase-separated composition having first regions of substantially matrix functionality and second regions of substantially electrolyte functionality. Adhesive and coating compositions and methods of disbonding also are described. A bonded joint may be obtained by applying an adhesive of the invention to a suitable surface as a solution, a melt or a reactive mixture. Solvents, if used, may be removed by evaporation prior to mating the substrates, or may be absorbed by the coated substrate. Compositions applied as a melt, a solution, or a reactive mixture wet the substrates, and then solidify, in order to achieve a high level of adhesion.

U.S. Patent Application Publication No. 20040256246 discloses a method of electrolytically debonding a paint coating from an electrically nonconductive member wherein the paint coating is bonded to a surface of the nonconductive member. The method comprises providing an electrode blanket on the paint coating, the electrode blanket comprised of a first blanket layer in contact with the paint coating, a negative electrode layer in contact with the first blanket layer, a second blanket layer covering the negative electrode layer, a positive electrode layer in contact with the second blanket layer, and a third blanket layer covering the positive electrode layer. An aqueous-based electrolyte solution is applied to the electrode blanket. An electric current is passed from the negative electrode to the positive electrode, evolving hydrogen at the negative electrode, thus creating an alkaline condition thereby causing delamination and degrading of the paint coating on the electrically nonconductive member. Solvent is not used as a component of the removable material discussed in the U.S. Patent Application Publications No. 20010031367 and No. 20040256246. By the testing time the discussed materials are solvent-free. However, the presence of a solvent can be a factor influencing debonding properties of materials under an electric field effect. The gel-like materials are solvent-containing materials.

U.S. Pat. No. 6,027,075 concerns a system that can be used to modify ice adhesion strength of ice adhered to an object. The system includes an electrode that is electrically insulated from the object and a DC source, e.g., a battery, coupled to the object and the electrode. The source generates a DC bias to an interface between the ice and the object when the ice completes the circuit. The object is conductive or is doped as a semiconductor so that the DC bias applies a voltage to the interface which modifies the ice adhesion strength selectively as compared to the ice adhesion strength with substantially zero bias voltage at the interface. The strength can be increased or decreased relative to its static state (i.e., the state without applied voltage). In this manner, ice such as ice on an aircraft wing can be removed with less work. The system preferably includes an electrically insulating material disposed between the object and the electrode; the insulating material is substantially conformal to the object and the electrode. In most applications, the electrode includes a grid electrode shaped to conform to a surface of the object and each point of the grid electrode is in electrical contact with the source. Accordingly, a grid insulator is generally disposed between the object and the grid electrode. The system has high applicability to objects such as an aircraft wing, an automobile windshield, a bottom of a ski, a heel or sole or a boot or shoe, and an outer material of a power line. The system also includes a ferroelectric, ferromagnetic or semiconductor coating applied to power lines to auto-regulate the temperature of the lines to just above the melting point.

However, prior to the instant invention, there was no recognition of the use of an electric field usage for the bonding control of polymer gels. Such control is very desirable, since adhesive gels can be repeatedly applied to a surface if they can be removed without structural damage. Effective methods for adhesion control of polymer gels can therefore improve the quality of applications of removable adhesive materials.

SUMMARY OF THE INVENTION

The instant invention pertains generally to controlling the bonding behavior of materials; more specifically, it provides a means to turn bonding on or off in situations where reversible adhesion properties are desirable, more specifically in adhesive gel technology. The instant invention for bonding control methods and apparatus therefore provides significant advances in adhesive gel technology.

More particularly, the invention provides methods and related apparatus; the methods comprise the application of an electrical field to the interface between a sample and the substrate material, which field decreases the sample adhesion strength, thereby facilitating the desired results.

The invention accordingly has as an object, the provision of methods and apparatus whereby an electric field is utilized to modify or manipulate the strength and integrity of the adhesive bond of a material responsive to an electric field, or a "sample", to a substrate.

A sample may include, for example, polymer gels, microgels, nanogels, jellies, glues, scaffolds, biomembranes, biological fluids and tissues, and the like; an appropriate solvent may also be included in the sample.

The present invention thus also has as an object, the provision of an efficient and effective manner for controlling the adhesion strength of a sample to a substrate.

Still other objects and advantages of the invention will in part be obvious and will in part be apparent from the specification and drawings.

In one aspect, the invention features an apparatus to manipulate the adhesion strength of a sample. The apparatus comprises a pair of electrodes, separated by a gel sample, which apparatus serves to manipulate the adhesion strength.

In another aspect, the invention provides the effect of decreasing the adhesion properties of the sample by the application of an electric field.

In a further aspect, the invention provides the effect of the resumption of adhesion properties of the sample to the substrate following removal of the electric field.

DETAILED DESCRIPTION OF THE PREFERRED EMBODIMENTS

Figure 1:
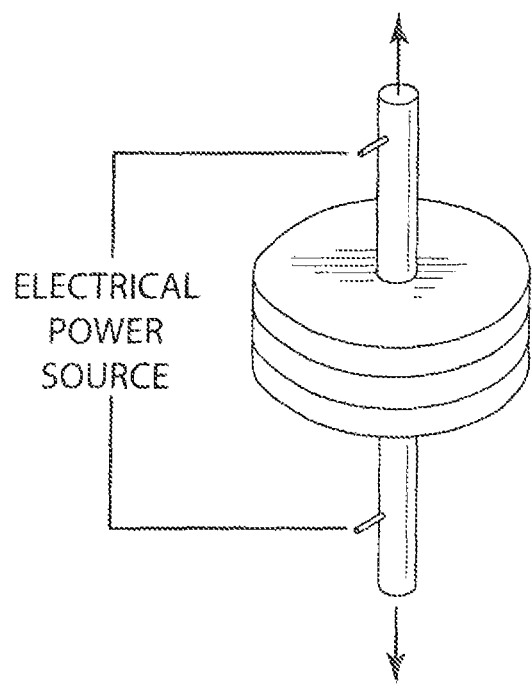
FIG. 1 is a schematic, perspective view of a pull-off adhesion test under the effect of electric field.

It has been discovered that an electric field is an effective tool to control the adhesion of gels responsive to the electric field. Adhesion of various types of hydrogels can be reduced significantly up to zero value by applying an electric field.

Conversely, it has been discovered that there is a resumption of the adhesion properties of the sample following elimination of the application of the electric field, thereby resuming the strength and integrity of the adhesive bond of the previously disbonded material to the substrate.

The present invention includes the use of an electric field as a tool for bonding-disbonding control. According to the instant invention, an electric field can be used to regulate the adhesion strength of various substances, including poly(N-isopropylacrylamide) (PNIPAAm), polyacrylamide (PAAm) and poly(ethylene oxide) (PEO) hydrogels.

Said materials pass through several structural transformations when an electric field is applied. Reversible and repeatable orientational changes of gel dipoles when an electric field is applied decrease the amount of gel molecules at the interface with a substrate. Preferable hydrogen bonding depends on the value of the electric field applied. Interchain and intrachain hydrogen bonding between polymer macromolecules transforms into chain-water hydrogen bonding. For example, the amide groups of PNIPAAm are involved in hydrogen bonding with water molecules. The gel transforms from a collapsed to an extended state under the effect of electric field. Orientation of macromolecules and polymer-water interactions lead to modification of electric-field-responsive wetting properties.

The instant invention provides a novel type of advanced electroactive adhesive. Those electroactive adhesives have the capability to be controlled and can resolve difficulties in applications where conventional adhesives and glues are not the most effective in adhering two surfaces.

The electric-field-responsive material may be selected, for example, from the group consisting of a gel-forming or jelly-forming solvent-containing polymer material, a biological fluid, a biomembrane, a tissue, a scaffold and a glue.

More specifically, the electric-field-responsive material may for example, comprise in part a material selected from the group consisting of aliphatic and aromatic polyethers, acrylic polymers, vinyl polymers, polyamides, polyacrylates, polyacrylamides, polynitriles, nitrile-functionalized polymers, polyvinyl pyridines, aliphatic and aromatic hydrocarbon polymers, silicone polymers, phosphazine polymers, cellulose, fluoropolymers, polysulfides, polyesters, and blends, and copolymers, and compositions thereof.

More specifically, the electric-field-responsive material may be, for example, polyacrylamide, poly(N-isopropylacrylamide), poly(N-isopropylacrylamide-co-1-vinylimidazole), poly(N,N-dimethylacrylamide), poly(N,N-diethylacrylamide), poly(1-vinylimidazole), poly(sodium acrylate), poly (sodium methacrylate), poly(2-hydroxyethylmethacrylate), poly(N,N-dimethylaminoethyl methacrylate), poly(N-[tris (hydroxymethyl)methyl]acrylamide), poly(1-(3-methacryloxy)propylsulfonic acid) (sodium salt), poly(allylamine), poly(N-acryloxysuccinimide), poly(N-vinylcaprolactam), poly(1-vinyl-2-pyrrolidone), poly(1-acrylamido-2-methyl-1-propanesulfonic acid) (sodium salt), poly((3-acrylamidopropyl) trimethylammonium chloride), and poly(diallyldimethylammonium chloride).

Additionally, the electric-field-responsive material may further be selected from the group consisting of agar, agarose, pectin, guar gum, gelatin, proteins and lipids of cell membranes, lipid bilayers, the polar headgroups of the lipids, polysaccharides, sulphated polysaccharides and other biopolymers.

Additionally, the electric-field-responsive material may further be selected from biodegradable materials for biomedical applications. Those materials may further be selected from the group consisting polyanhydrides, polyorthoesters, polyphosphazenes, polymers of lactic acid, polymers of glycolic acid, poly(dioxanone), poly(trimethylene carbonate), poly (ε-caprolactone), polylactide, polyalkylene esters, polyamide esters, polyvinyl esters, and blends, and copolymers, and compositions thereof.

In one embodiment, the polymeric material is present in the electric-field-responsive material in an amount of from about 0.1 to 99 weight percent, based on the total weight of the electric-field-responsive material.

The electric potential difference may be generated by an electric field potential source transferred to electrodes between which an electric field develops. The electrode may be, for example, a roll, a tube, a tubing, a hose, a conveyor belt, a drum former or a magnet.

More specifically, the electric field potential source may be an electrostatic generator wherein one of the electrodes is grounded.

In yet another embodiment, the electrode is an electrolyte solution wherein the electrode is a solvent-based electrolyte solution and wherein the solvent for electrolyte is different from the solvent which is present in the gel together with the polymeric material. The electric potential source creates a direct electric field, wherein after disbonding one of two bonds, the poles may be switched to disbond yet another bond.

In yet a further embodiment, the electric potential source may produce the alternating electric field.

In one embodiment, the substrate is positioned on the electrode and the material responsive to an electric field is contacted directly with the substrate but not with electrode.

In a further embodiment, the material responsive to an electric field is a magnetically responsive material.

The electric field source may be, for example, at a voltage potential between about 0.01 volts to about 1000 kilovolt per millimeter of space between the electrodes. In yet a further embodiment other atoms and molecules other than polymeric macromolecules and solvent molecules are present in the electric-field-responsive material in an amount of from 0 to approximately less than 5 weight percent, based on the total weight of the electric-field-responsive material.

In yet a further embodiment, the apparatus comprises a direct-current ammeter connected in circuit with the electrode and a source for determining the direct-current conductivity of the material.

The apparatus may alternatively comprise an alternating-current source and alternating-current ammeter connected in circuit with the electrode and source for determining the alternating-current conductivity of the material.

In one embodiment, the alternating-current source generates one or more frequencies between about 1 Hz to 10000 kHz.

In yet a further embodiment, the apparatus further comprise a current comparator, coupled to the direct-current and alternating-current ammeters, for generating a signal representative of a ratio between the direct-current and alternating-current conductivities.

Another element present may be an inductor for reducing cross-coupling between alternating electric field and direct electric field signals.

In a preferred embodiment, poly(N-isopropylacrylamide) (PNIPAAm), polyacrylamide (PAAm) and poly(ethylene oxide) (PEO) hydrogels may, for example, be used in the sample.

PNIPAAm hydrogel is prepared by carrying out UV-induced polymerization. PAAm and PEO hydrogels are obtained from polymer aqueous solution.

In order to demonstrate the adhesion effect, the "pull-off" adhesion test may be utilized. This pull-off adhesion test is a characteristic technique to measure the pull-off force required to disbond a specific diameter (e.g. 35.6 mm) of gel away from one of its substrates.

In one embodiment, a sample of a hydrogel 102 is placed between the flat faces of two aluminum dollies 104 and 106 (FIG. 1).

Load is increased within the system. When the load on the gel-dolly interface becomes larger than the adhesion strength between the gel and the dolly, separation occurs.

The adhesion strength of an adhesive bond is calculated by dividing the measured force necessary to disconnect the bond by the gel-aluminum contact area.

The above method is used to determine the adhesion strength when no electric field is applied.

Figure 2:
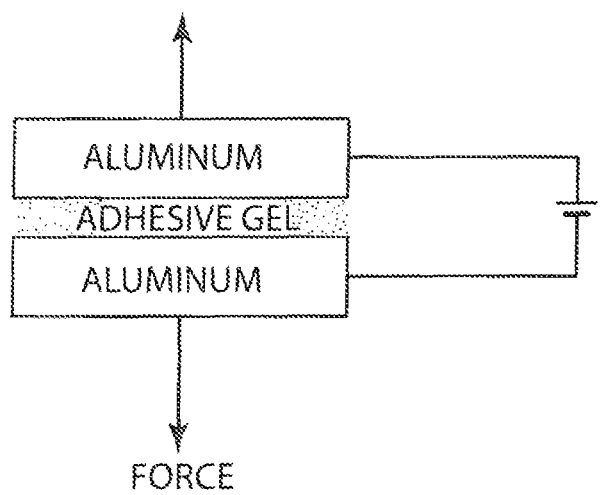
FIG. 2 schematically illustrates a technique for electrical disbonding of gel-aluminum bond.
Figure 3:
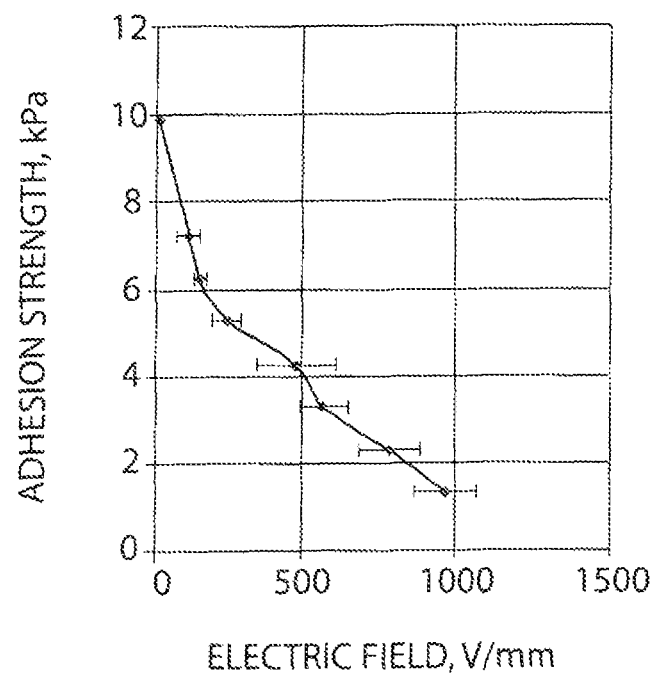
FIG. 3 is a graphical representation of the electric field effect on the adhesion strength of poly(N-isopropylacrylamide) hydrogel.
Figure 4:
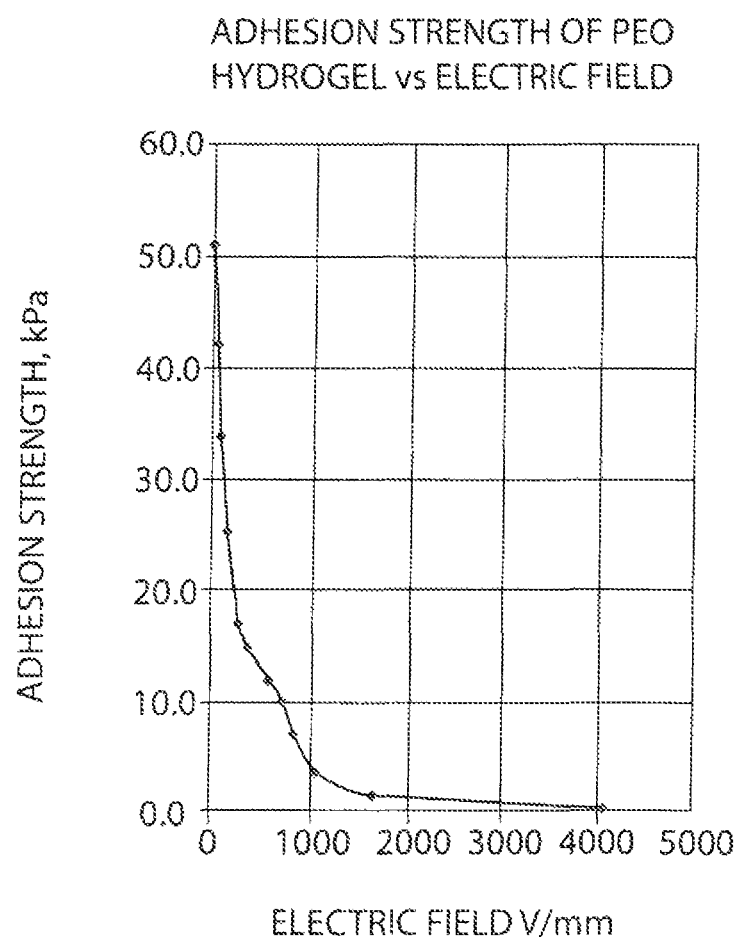
FIG. 4 is a graphical representation of the electric field effect on the adhesion strength of poly(ethylene oxide) hydrogel.

The above-mentioned aluminum dollies are used as electrodes to apply a direct electric field on a hydrogel sample and to test electric-field effect on adhesion strength (FIG. 2). An electric power 108 supply produces a specified potential difference, which creates a specified electric field between aluminum dollies attached to the power supply terminals. Pull-off adhesion tests are carried out while electric field is applied to the system. Disbonding force decrease is found to be proportional to the increase in the electric field (FIG. 3 and FIG. 4). The disbonding occurs on the cathode surface.

Each hydrogel utilized in accordance with the instant invention is completely disbonded at almost no disbonding force by reaching the disbonding (critical) electric field. The magnitude of disbonding electric field varies from polymer to polymer, however the pattern is similar for the subject hydrogels. Gel adhesion resumes when no electric field is applied.

The invention encompasses alternative compositions of matter, apparatus, and methods, of which one of skill in the art would be aware. For example, the adhesion of the gel may be modified or otherwise controlled by varying one or more other parameters such as magnetic field, pH, temperature, pressure, ion concentration, and the like.

A controllable adhesive, consistent with the present invention, may be used for such utilities as in facilitating climbing, releaseably handing objects, or releaseably attaching objects. For example, a controllable adhesive prepared in accordance with the instant invention may also serve as a scaffold for growing biological material, and the like.

Other applications in which the removable adhesive according to the instant invention would find utility include, for example, removable labels, temporary signs and banners, attaching credit cards to mailers, postable notes, and bookmarks.

Additional uses of the invention system may also include, for example, the ready disassembly of parts for reuse or recycling, removable electronic encapsulants and conformal coatings, preparing modular assemblies for testing and diagnostic disassembly and advanced delatching and deployment mechanisms.

The invention is also be useful in the control of microorganisms, cells and protein adhesion on medical devices, contact lenses, cardiovascular prostheses, abdominal meshes, and wound dressings, and the like.

Additionally, the invention provides anti-fouling surfaces for food and biotech processing, anti-mist surfaces for food packaging, surface treatment of textiles for stain release and preparation for ink jet printing, antifouling surfaces for water purification plants, anti-fingerprint surfaces for decorative films, and the like.

The teachings of the instant invention could also be utilized in a novel wall-crawling device, since a phenomenon of reversible adhesion according to the instant invention, makes it possible for several parts of a moving vehicle to adhere, or become "stuck" to a surface, while other parts, more or less simultaneously, can become "unstuck".

Yet further industries can utilize this invention, for example, the inventive process is useful in biochips and biosensors, in which there is a limited lifetime because of surface fouling, technical textiles having water repellency, or biochemical functions.

EXAMPLES

Example 1

A sample of 5 mass % poly(N-isopropylacrylamide) hydrogel was prepared by carrying out UV induced polymerization and placed between the flat faces of two aluminum dollies. The pull-off adhesion test of the sample was performed at no electric field applied to determine the adhesion strength of the sample at no electric field applied. The dollies were used as electrodes to apply a direct electric field on the hydrogel sample. The electric-field effect on adhesion strength was tested by conducted pull-off adhesion tests while the electric field was applied to the system.

The results of mechanical testing of adhesion strength between the poly(N-isopropylacrylamide) gel and aluminum are set forth in FIG. 3. The disbonding electric field is about 1500 V/mm.

Example 2

A sample of poly(ethylene oxide) hydrogel was prepared from 2.0 g of poly(ethylene oxide) and 8.0 mL of water and the test was carried out as in Example 1. The results of mechanical testing of adhesion strength between the poly(ethylene oxide) gel and aluminum are set forth in FIG. 4. The adhesion strength of the sample to an aluminum dolly is 51 kPa with no electric field applied. The cathode-surface joint was disbonded at 25.4 kPa after 185 V/mm was applied. As seen in FIG. 4, the disbonding electric field at almost zero mechanical load applied is about 4000 V/mm.

Example 3

A sample of polyacrylamide was prepared from 1.5 g of polyacrylamide and 8.5 mL of water and the test was carried out as in Example 1. Adhesion strength of the sample to an aluminum dolly is 22 kPa with no electric field applied. The cathode-surface joint was disbonded at 5.8 kPa after 29 V/mm was applied.

Example 4

A sample of poly(ethylene oxide) hydrogel was prepared from 2.0 g of poly(ethylene oxide) and 8.0 mL of water and the test was carried out as in Example 1. The adhesion strength of the sample to an aluminum dolly is 51 kPa with no electric field applied. The cathode-surface joint was disbonded at 25.4 kPa after 185 V/mm was applied. The disbonded sample was applied back to the dolly at no electric field applied. The pull-off adhesion test of the sample was performed at no electric field applied. The adhesion strength of the sample to the dolly with no electric field applied resumes to about the initial value of adhesion strength at 51 kPa.

Example 5

A sample of gelatin gel was prepared by dissolving gelation in water at 90° C., cooling to 5° C. A sample ionized gelatin gel was prepared by dissolving gelatin in 0.1 M aqueous solution of NaCl at 90° C. cooling to 5° C. Adhesion strength of gelatin gel to the aluminum dollies is 83 kPa. Adhesion strength of the ionized gelatin gel to the aluminum dollies is 42 kPa.

It should be obvious to one skilled in the art that there are many choices of electroresponsive materials that will accomplish the objective of this invention. Each has different tradeoffs and implementation considerations depending on the specific application.

The listed claims include alternative compositions of matter, apparatus, and methods. Further, the adhesion of the gel may be modified or otherwise controlled by varying one or more other parameters such as magnetic field, pH, temperature, pressure including hydrophobic pressure, ion concentration, etc.

It will be understood that the above description of the present invention is susceptible to various modifications, changes and adaptations, and the same are intended to be comprehended within the meaning and range of equivalents of the appended claims. The most obvious modification, for example, is the use of various gel materials as the electroresponsive composition of matter.

It will thus be seen that the objects set forth above, among those made apparent from the preceding description, are efficiently attained and, since certain changes may be made in carrying out the above method (process) without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method for disbonding an adhesive bond between an electric-field-responsive material and a substrate, comprising:
    applying an electric field to reduce the strength and integrity of said adhesive bond;
    wherein said electric-field-responsive material comprises a polymeric material and a solvent; and
    wherein said electric field is applied before said solvent is removed.

2. A method for disbonding an adhesive bond between an electric-field-responsive material and a substrate, comprising:
    applying an electric field to reduce the strength and integrity of said adhesive bond;
    wherein said electric-field-responsive material comprises a polymeric material and an appropriate solvent; and
    wherein said appropriate solvent is included in said electric-field-responsive material at disbonding.

3. A method for disbonding an adhesive bond between an electric-field-responsive material and a substrate, comprising:
    applying an electric field to reduce the strength and integrity of said adhesive bond;
    wherein polymeric macromolecules and solvent molecules are present in said electric-field-responsive material at disbonding by said electric field.

4. The method according to according to any of claims 1-3;
    wherein said electric field is equal to or exceeds the disbonding electric field that is sufficient to completely disbond said electric-field responsive material when no mechanical load is applied, so that the electric-field-responsive material is completely removed from said substrate with no mechanical load being applied to the electric-field-responsive material.

5. A method for controlling the adhesion strength of the adhesive bond between an electric-field-responsive material and a substrate, comprising:
    applying an electric field to completely disbond and remove said electric-field-responsive material from said substrate;
    eliminating the application of said electric field and applying said electric-field-responsive material to the substrate or to another substrate, thereby at least partially resuming the strength and integrity of the adhesive bond of the previously disbonded material to said substrate or said other substrate, respectively;
    wherein said electric-field-responsive material comprises a polymeric material and a solvent; and
    wherein said electric field is applied before said solvent is removed.

6. A method for controlling the adhesion strength of the adhesive bond between an electric-field-responsive material and a substrate, comprising:
    applying an electric field to completely disbond and remove said electric-field-responsive material from said substrate; and
    eliminating the application of said electric field and applying said electric-field-responsive material to the substrate or to another substrate, thereby at least partially resuming the strength and integrity of the adhesive bond of the previously disbonded material to said substrate or said other substrate, respectively;
    wherein said electric-field-responsive material comprises a polymeric material and an appropriate solvent; and
    wherein said appropriate solvent is included in said electric-field-responsive material at disbonding.

7. A method for controlling the adhesion strength of the adhesive bond between an electric-field-responsive material and a substrate, comprising:
    applying an electric field to completely disbond and remove said electric-field-responsive material from said substrate; and
    eliminating the application of said electric field and applying said electric-field-responsive material to the substrate or to another substrate, thereby at least partially resuming the strength and integrity of the adhesive bond of the previously disbonded material to said substrate or said other substrate, respectively;
    wherein polymeric macromolecules and solvent molecules are present in said electric-field-responsive material at disbonding by said electric field.

8. The method according to any of claims 5-7;
    wherein the electric-field-responsive material previously disbonded from the substrate is applied to the other substrate.

9. The method according to any of claims 1-3 and 5-7;
    wherein the electric-field-responsive material is selected from the group consisting of a jelly-forming material, a biological fluid, a biomembrane, a tissue, a scaffold, and other biopolymers.

10. The method according to any of claims 1-3 and 5-7;
    wherein the electric-field-responsive material is selected from the group consisting of an electroactive adhesive and a glue.

11. The method according to any of claims 1-3 and 5-7;
    wherein the electric-field-responsive material is selected from the group consisting of gel-forming solvent-containing polymer materials.

12. The method according to claim 11;
    wherein a component of the electric-field-responsive material is selected from the group consisting of aliphatic and aromatic polyethers, acrylic polymers, vinyl polymers, polyamides, polyacrylates, polyacrylamides, polynitriles, nitrile-functionalized polymers, polyvinyl pyridines, aliphatic and aromatic hydrocarbon polymers, silicone polymers, phosphazine polymers, cellulose, fluoropolymers, polysulfides, and polyesters, and blends, copolymers, and compositions thereof.

13. The method according to claim 11;
    wherein a component of the electric-field-responsive material is selected from the group consisting of polyvinyl alcohol, polyvinyl acetate, polyvinyl morpholinone, poly(2-vinylpyridine), polyacrylic acid, alkali metal salts of polyacrylic acid, ethylene maleic anhydride copolymers, polyvinyl ethers, carboxymethyl cellulose, hydroxypropyl cellulose, carboxymethyl cellulose, sulphated polysaccharides, polymers of vinyl sulfonic acid, poly(ethylene glycol), polypropylene glycol), poly(ethylene oxide), polypropylene oxide), and copolymers of ethylene oxide and propylene oxide, and blends, copolymers, and compositions thereof.

14. The method according to claim 11;
wherein a component the electric-field-responsive material is selected from the group consisting of polyacrylamide, poly(N-isopropylacrylamide), poly(N-isopropylacrylamide-co-1-vinylimidazole), poly(N,N-dimethylacrylamide), poly(N,N-diethylacrylamide), poly(1-vinylimidazole), poly(sodium acrylate), poly(sodium methacrylate), poly(2-hydroxyethylmethacrylate), poly(N,N-dimethylaminoethyl methacrylate), poly(N-[tris(hydroxymethyl)methyl]acrylamide), poly(1-(3-methacryloxy)propylsulfonic acid) (sodium salt), poly(allylamine), poly(N-acryloxysuccinimide), poly(N-vinylcaprolactam), poly(1-vinyl-2-pyrrolidone), poly(N-vinyl pyrrolidone), poly(dimethylaminoethyl methacrylate), poly(2-acrylamido-2-methyl-1-propanesulfonic acid) (sodium salt), poly((3-acrylamidopropyl)trimethylammonium chloride), and poly(diallyldimethylammonium chloride), and blends, copolymers, and compositions thereof.

15. The method according to claim 11;
wherein a component of the electric-field-responsive material is selected from the group consisting of polyanhydrides, polyorthoesters, polyphosphazenes, polymers of lactic acid, polymers of glycolic acid, poly(dioxanone), poly(trimethylene carbonate), poly($\epsilon$-caprolactone), polylactide, polyalkylene esters, polyamide esters, and polyvinyl esters, and blends, copolymers, and compositions thereof.

16. The method according to claim 11;
wherein the polymeric material is present in the electric-field-responsive material in an amount of from about 0.1 to 99 weight percent, based on the total weight of the electric-field-responsive material.

17. The method according to claim 11;
wherein the electric-field-responsive material further comprises other atoms and molecules, which are different from the macromolecules of the polymeric material and the molecules of the solvent.

18. The method according to claim 11;
wherein said electric-field-responsive material comprises a hydrogel.

19. The method according to any of claims 1-3 and 5-7;
wherein a component of the electric-field-responsive material is biodegradable.

20. The method according to any of claims 1-3 and 5-7;
wherein said solvent is water.

21. The method according to any of claims 1-3 and 5-7, further comprising:
utilizing an apparatus to manipulate the adhesion strength of the electric-field-responsive material to the substrate;
wherein the substrate comprises an electrode;
wherein the apparatus comprises a pair of electrodes;
wherein the pair of apparatus electrodes are separated from each other by the electric-field-responsive material; and
wherein the pair of apparatus electrodes are optionally under a mechanical load.

22. The method according to any of claims 1-3 and 5-7;
wherein an electric potential difference generated by an electric field potential source is transferred to more than one electrode between which the electric field develops.

23. The method according to claim 22;
wherein the electric potential source is an electrostatic generator.

24. The method according to claim 22;
wherein at least one of the electrodes is grounded.

25. The method according to claim 22;
wherein at least one of the electrodes is an electrolyte solution.

26. The method according to claim 25;
wherein a solvent for the electrolyte solution is different from the solvent in the electric-field-responsive material.

27. The method according to claim 22;
wherein the electric potential source creates the direct electric field.

28. The method according to claim 27;
wherein, after the disbonding of one of two bonds, the polarity of the electrodes is switched to disbond one or more additional bonds.

29. The method according to claim 28;
wherein the electric potential source further comprises an alternating and/or a direct electric potential source connected in a circuit with the electrodes.

30. The method according to claim 22;
wherein the electric potential source creates an alternating electric field.

31. The method according to claim 30;
wherein the electric potential source generates an alternating electric field at one or more frequencies between about 1 Hz to 10000 kHz.

32. The method according to claim 22;
wherein at least one of the electrodes is a roll, a tube, a tubing, a hose, a conveyor belt, or a drum.

33. The method according to claim 22;
wherein a substrate is positioned on at least one of the electrodes, and the electric-field-responsive material is contacted directly only by the substrate.

34. The method according to claim 22;
wherein at least one of the electrodes comprises a magnet.

35. The method according to claim 34;
wherein the electric-field-responsive material is a magnetically responsive material.

36. The method according to claim 22;
wherein the electric field is between from about 0.01 volts to about 1000 kilovolts per millimeter of space between the electrodes.

37. An apparatus for use in the method according to claim 22, comprising:
an ammeter connected in circuit with at least one of the electrodes and a source for determining the conductivity of the electric-field-responsive material.

* * * * *